2,769,852

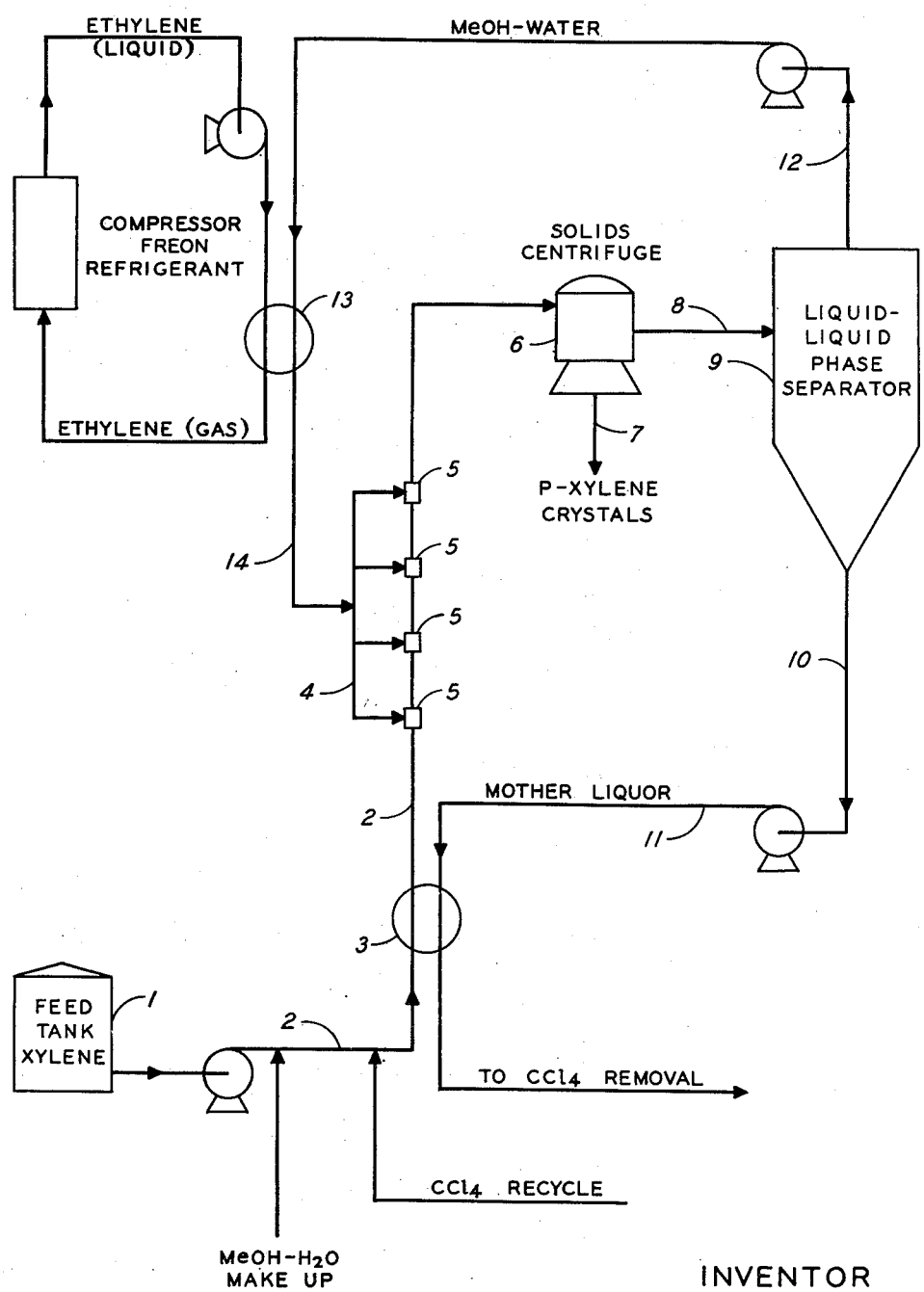

SEPARATION OF XYLENE ISOMERS BY FRACTIONAL CRYSTALLIZATION

Marvin H. Paulson, El Cerrito, Calif., assignor to California Research Corporation, San Francisco, Calif., a corporation of Delaware Application April 1, 1953, Serial No. 346,159

6 Claims. (Cl. 260—674)

This invention relates to an improved method for separating hydrocarbon mixtures by fractional crystallization.

More particularly, it relates to a process for separating mixed xylenes or individual xylene isomers from xylene concentrates by fractional crystallization.

The problem of separating xylene isomers, especially para-xylene, from narrow boiling hydrocarbon fractions having a high xylene concentration has been before the art for a considerable period of time. Various methods for separating para-xylene from xylene concentrates by fractional crystallization have been proposed. It has been proposed to cool the xylene concentrates by indirect heat exchange to a point at which para-xylene crystals form. It has also been proposed to cool the xylene concentrate by direct cooling through the introduction of a liquefied normally gaseous material into the xylene concentrate and evaporation of the normally gaseous material to bring about the desired cooling. Both methods of cooling give rise to the problems which are difficult of solution. When it is attempted to cool the xylene concentrate by indirect heat exchange, solid xylenes tend to accumulate on the heat exchange surfaces, causing marked reduction in heat exchange efficiencies and ultimately plugging the exchanger tubes. Cooling by direct heat exchange through the introduction of a liquefied normally gaseous material into the xylene concentrate is likewise fraught with problems. Normally gaseous hydrocarbons such as ethane or ethylene are best suited for this use from the standpoint of the degree of cooling which must be achieved. However, these materials remain in solution in the mother liquor and evaporate during the separation of the solid xylene from the mother liquor, creating prohibitive fire and explosion hazards. Noncombustible normally gaseous materials have been proposed, but those which are economically feasible for use are not adapted to cool the xylene mixture below about —90° F., thus making good recovery of para-xylene difficult and recovery of meta-xylene from the para-xylene mother liquor impossible.

A method has now been found for cooling xylene concentrates by indirect heat exchange which is free from the above-noted difficulties. Pursuant to the present invention, a mixture of methanol and water having a composition such that the methanol to water ratio is in the range from about 10:2 to 10:6 is cooled to a temperature below —100° F. and then directly contacted with the xylene concentrate. A solid xylene phase, a liquid hydrocarbon phase and a liquid methanol-water phase are recovered from the resultant mixture. The methanol-water phase is then cooled by indirect heat exchange to a temperature below —100° F. for contact with further quantities of the xylene concentrate.

British Patent No. 677,368 discloses a method for increasing the recovery of para-xylene from xylene concentrates by adding carbon tetrachloride to the xylene concentrate and cooling the resultant mixture to separate a solid phase comprising para-xylene and carbon tetrachloride. The method of the present invention is excellently adapted to cool such mixtures of xylene concentrate and carbon tetrachloride to separate the para-xylene-carbon tetrachloride solid.

The methanol-water mixtures suitable for use in the process of the invention should contain methanol and water in concentration such that the methanol-water ratio is in the range from about 10:2 to 10:6. If the methanol-water ratio of the mixture is appreciably above 10:2, it is found that solid hydrocarbons are deposited on the indirect heat exchange surfaces when the methanol-water phase is recirculated to indirect heat exchange after separation from the cooled xylene concentrate. If the methanol-water ratio is appreciably lower than 10:6, the freezing point of the mixture is too high for successful use in the process.

The process of the invention is illustrated by the following examples.

Example 1

600 parts by weight of a methanol-water mixture containing methanol and water at a weight ratio of methanol to water of 10:2 were cooled to —140° F. and mixed with 200 parts by weight of a xylene concentrate which had been precooled to —35° F. The equilibrium temperature of the resulting mixture was —108° F. Three phases were formed and separated: a solid para-xylene phase, a hydrocarbon phase rich in meta-xylene, and a methanol-water phase having a very low hydrocarbon content. The phases were readily separated by gravity, settling in approximately 15 minutes.

Example 2

One part by weight of a xylene concentrate containing 3.5% para-xylene, 54% meta-xylene, 12% ortho-xylene, 14.5% ethylbenzene and 16% of nonaromatic hydrocarbons was mixed with 3 parts by weight of a methanol-water mixture containing methanol and water at a weight ratio of 10:2. The equilibrium temperature of the mixture of the precooled xylene concentrate with the cold methanol-water was —120° F. This mixture was centrifuged at —120° F. in a basket centrifuge and meta-xylene crystals were recovered. The mother liquor consisting of xylene and methanol-water was settled to separate a methanol-water phase and a hydrocarbon phase. In this case it was found that the time required for gravity settling of the phases was rather long due to the small differential in specific gravity and that separation was more desirably effected in a liquid centrifuge. The meta-xylene crystal cake was melted without washing and found to have a meta-xylene content of 75%, indicating that the holdup in the mother liquor in the case was not excessive. The meta-xylene purity can be greatly increased by reslurrying the cake with a meta-xylene-rich liquid and refiltering.

Example 3

600 parts by weight of a methanol-water mixture containing methanol and water at a weight ratio of 10:5 were cooled to —130° F. and added to a mixture of 100 parts by weight of carbon tetrachloride and 100 parts by weight of a xylene concentrate containing 19% para-xylene, 46% meta-xylene, 10% ortho-xylene, 12% ethylbenzene and 13% nonaromatic hydrocarbons. The carbon tetrachloride-xylene mixture had been precooled to —40° F. After these materials were mixed together, an equilibrium temperature of approximately —115° F. was obtained. The mixture was centrifugally filtered to recover a solid para-xylene-carbon tetrachloride phase and a mother liquor phase. The mother liquor phase was settled, forming a hydrocarbon phase and a methanol-water phase. Phase separation was complete in less than 5 minutes.

Example 4

600 parts by weight of a methanol-water mixture containing methanol and water at a weight ratio of 65:35 was cooled to −131° F. and added to a mixture of 100 g. of carbon tetrachloride and 100 g. of a xylene concentrate which had been precooled to −50° F. The xylene concentrate had the same composition as that of Example 3. The equilibrium temperature of the mixture was −114° F. A solid carbon tetrachloride-para-xylene phase was recovered and the mother liquor separated into a methanol-water phase and a hydrocarbon phase in approximately 5 minutes.

Example 5

250 parts by weight of a methanol-water mixture containing methanol and water at a weight ratio of 70:30 were cooled to −110° F. A mixture of 100 g. of carbon tetrachloride and 100 g. of xylene concentrate was cooled to −50° F. The cold methanol-water mixture was slowly added to the xylene-carbon tetrachloride mixture. An additional 350 parts by weight of a methanol-water mixture of the same composition at −150° F. was added in small increments over a period of about 10 minutes. The equilibrium temperature was −110° F. A para-xylene-carbon tetrachloride solid phase, a methanol-water liquid phase, and a hydrocarbon phase were separated from the resulting mixture. The para-xylene carbon tetrachloride crystals recovered in this run were larger and of a more granular appearance than those obtained in the preceding examples. Stagewise addition of the cold methanol-water mixture avoids shock-chilling of the xylene concentrate which results in the production of very small crystals which are difficult to filter and in which the mother liquor holdup is relatively high.

As indicated in the foregoing examples, the xylene concentrate is desirably precooled to a temperature in the range from −10 −50° F., and preferably to about the point of incipient crystallization, before mixing with the cold methanol-water mixture.

The methanol-water mixture is cooled by indirect heat exchange to a temperature below −100° F. and generally in the range from −120° F. to −175° F. before mixing with the xylene concentrate.

The quantity of methanol-water added to the xylene concentrate will vary depending upon the temperature to which the xylene concentrate is precooled, the temperature to which the methanol-water mixture is cooled, and the quantity of solid xylene desired to be separated. Where it is desired to recover a large proportion of the xylene concentrate in solid form, it is desirable to use a relatively large volume of methanol-water to avoid the production of very thick slurries which are difficult to handle during filtration. Where this type of operation is contemplated, the methanol-water acts not only as a direct refrigerant, but also as a diluent in the slurry.

An arrangement of apparatus and process flow suitable for the practice of the invention is shown in the appended drawing.

A xylene concentrate is passed from storage tank 1 through line 2 and heat exchanger 3 toward centrifuge 6. In heat exchanger 3 the xylene feed is cooled by indirect heat exchange to approximately −50° F. Cold methanol-water is introduced into line 2 from manifold line 4 and is mixed with the precooled xylene in multiple pipe mixers 5. The resultant slurry passes into centrifuge 6 where it is separated into a oslid para-xylene phase which is removed through line 7 and a mother liquor phase comprising unsolidified hydrocarbons and the methanol-water mixture. The mother liquor phase is passed from the centrifuge through line 8 into liquid phase separator 9 which may be either a liquid centrifuge or a gravity settler. The hydrocarbon phase is withdrawn from separator 9 through line 10 and passed through heat exchanger 3 in indirect heat exchange with the xylene feed and then removed from the system. If carbon tetrachloride has been employed in the process the hydrocarbon phase is directed to a carbon tetrachloride removal still. The methanol-water phase is removed from separator 9 through line 12 and is passed through heat exchanger 13 in indirect exchange with a refrigerant, for example, liquid ethylene. The cooled methanol-water mixture is withdrawn from heat exchanger 13 and passed through line 14 into manifold line 4 for mixing with further quantities of xylene. Makeup methanol-water may be introduced into line 2 as required. If carbon tetrachloride is employed in the separation process, it is desirably introduced into line 2 at a point ahead of heat exchanger 3.

The xylene concentrates charged to the process of the invention may have a variety of compositions, but will ordinarily have a xylene content in excess of 50% by weight. The remainder of the concentrate will consist predominantly of ethylbenzene and of nonaromatics which are not readily separable from the xylenes by fractional distillation. The xylene feed stocks will ordinarily have para-xylene contents ranging from 1 to 25% by weight, meta-xylene contents ranging from 40 to 70% by weight, ortho-xylene contents ranging from 5 to 40% by weight, ethylbenzene contents ranging from 2 to 20% by weight and nonaromatic hydrocarbon contents ranging from 1% to about 20% by weight. Xylene concentrates having para-xylene contents above about 5% by weight, and preferably above 15% by weight, are desirably processed for para-xylene recovery. The mother liquor produced during selective crystallization of para-xylene will ordinarily have a para-xylene content of about 8% by weight if simple freezing is employed and about 3% by weight, or lower, if carbon tetrachloride is used to increase the para-xylene recovery. Mother liquors of this character having rather low para-xylene contents can be treated by the process of the invention to separate a solid xylene fraction consisting predominantly of meta-xylene.

I claim:

1. In a process for recovering xylenes from hydrocarbon liquids containing xylenes by fractional crystallization, the improved method which comprises cooling a mixture of methanol and water, containing 2 to 6 parts of water to 10 parts of methanol to a temperature below −100° F. by indirect heat exchange in a cooling zone, directly contacting sufficient cooled methanol-water mixture with said hydrocarbon liquid in a crystallization zone to cause formation of solid xylene crystals, separating a solid xylene phase from a mother liquor phase, settling the mother liquor phase to separate a hydrocarbon phase and a methanol-water phase, and returning the methanol-water phase to the cooling zone.

2. A process for separating xylenes from hydrocarbon liquids consisting predominantly of xylene isomers which comprises directly mixing the hydrocarbon liquid with a sufficient quantity of a cold methanol-water mixture containing methanol and water in proportions such that the methanol-water weight ratio is in the range from about 10:2 to 10:6 to cause formation of a solid xylene phase, recovering said solid xylene phase, settling the resultant liquid phase to cause separation of a hydrocarbon phase and a methanol-water phase, cooling the methanol-water phase by indirect heat exchange, and then mixing it with further quantities of said hydrocarbon liquids.

3. In a process for recovering para-xylene from hydrocarbon liquids containing para-xylene by fractional crystallization, the improved method which comprises cooling a mixture of methanol and water, containing 2 to 6 parts of water and 10 parts of methanol to a temperature below −100° F. by indirect heat exchange in a cooling zone, directly contacting sufficient of the cooled methanol-water mixture with said hydrocarbon liquid to cause formation of a solid para-xylene phase, separating said solid par-xylene phase, settling the resultant liquid phase to separate a hydrocarbon phase and a methanol-water phase, and returning the methanol-water phase to the cooling zone.

4. In a process for recovering meta-xylene from hydrocarbon liquids rich in meta-xylene by fractional crystallization, the improved method which comprises cooling a mixture of methanol and water, containing 2 to 6 parts of water to 10 parts of methanol to a temperature below —100° F. by indirect heat exchange in a cooling zone, directly contacting the cooled methanol-water mixture with said hydrocarbon liquid, recovering a solid phase comprising meta-xylene, a liquid hydrocarbon phase and a liquid methanol-water phase from the resultant mixture, passing the liquid methanol-water phase into the cooling zone and cooling it to a temperature below about —100°F. and then directly contacting it with further quantities of said hydrocarbon liquid.

5. In a process for recovering xylenes from hydrocarbon liquids containing xylenes by fractional crystallization, the improved method which comprises cooling a mixture of methanol and water, containing methanol and water in proportions such that the weight ratio of methanol to water lies in the range from about 10:2 to 10:6 to a temperature below —100° F. by indirect heat exchange in a cooling zone, directly contacting the cooled methanol-water mixture with said hydrocarbon liquid in a crystallization zone, recovering a solid xylene phase, a liquid hydrocarbon phase and a liquid methanol-water phase from the resultant mixture, cooling the methanol-water phase to a temperature below —100°F. by indirect heat exchange in a cooling zone and returning it to the crystallization zone with further quantities of said hydrocarbon liquid.

6. In a process for separating para-xylene from hydrocarbon liquids consisting predominantly of xylene isomers and containing substantial proportions of para-xylene by cooling a mixture of the hydrocarbon liquid and carbon tetrachloride to cause separation of a para-xylene-carbon tetrachloride solid phase, the improved method which comprises directly contacting the mixture of hydrocarbon liquid and carbon tetrachloride with a sufficient quantity of a cold methanol-water mixture containing methanol and water in proportion such that the methanol-water weight ratio is in the range from about 10:2 to 10:6 to cause formation of a solid para-xylene-carbon tetrachloride phase, separating a solid para-xylene-carbon tetrachloride phase from a mother liquor phase, settling the mother liquor phase to separate a carbon tetrachloride-hydrocarbon phase and a methanol-water phase, cooling the methanol-water phase to a temperature below about —100° F. by indirect heat exchange, and then contacting it with further quantities of said hydrocarbon liquid and carbon tetrachloride.

References Cited in the file of this patent

UNITED STATES PATENTS

| | | |
|---|---|---|
| 2,204,059 | Acken | June 11, 1940 |
| 2,257,616 | Miller | Sept. 30, 1941 |
| 2,435,792 | McArdle et al. | Feb. 10, 1948 |
| 2,615,058 | Swietoslawski | Oct. 21, 1952 |

FOREIGN PATENTS

| | | |
|---|---|---|
| 39,914 | Norway | Oct. 13, 1924 |
| 960,364 | France | Apr. 17, 1950 |
| 677,368 | Great Britain | Aug. 13, 1952 |